UNITED STATES PATENT OFFICE.

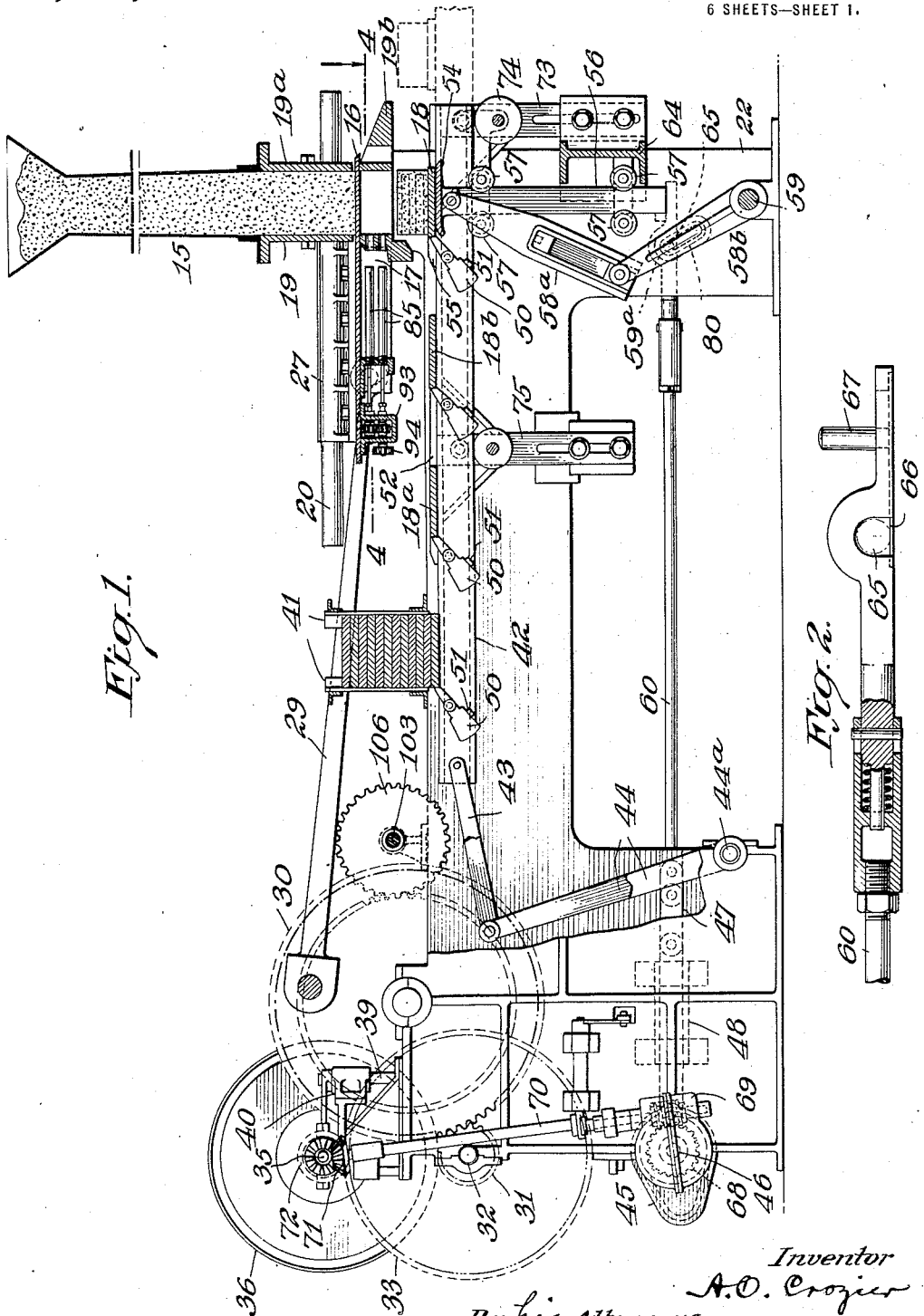

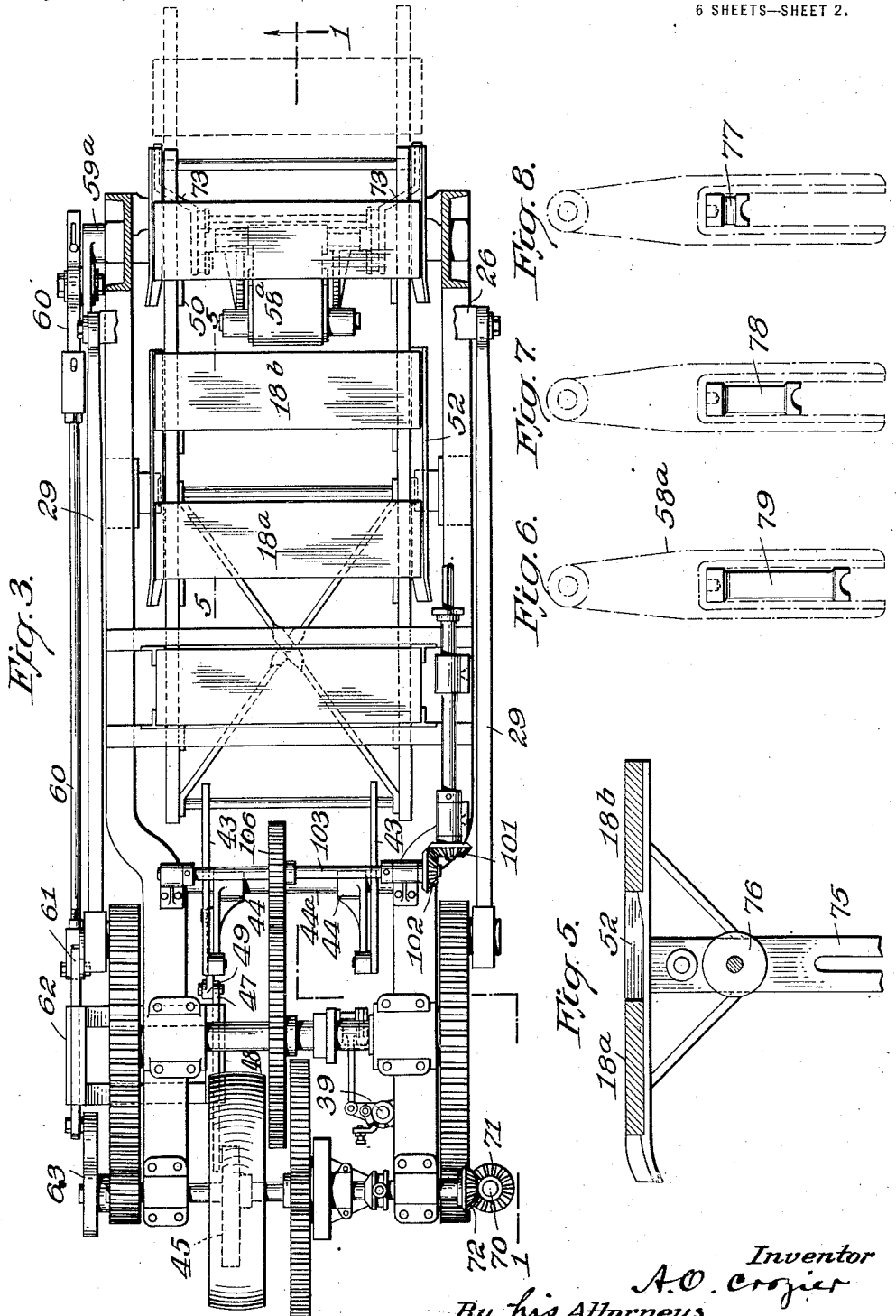

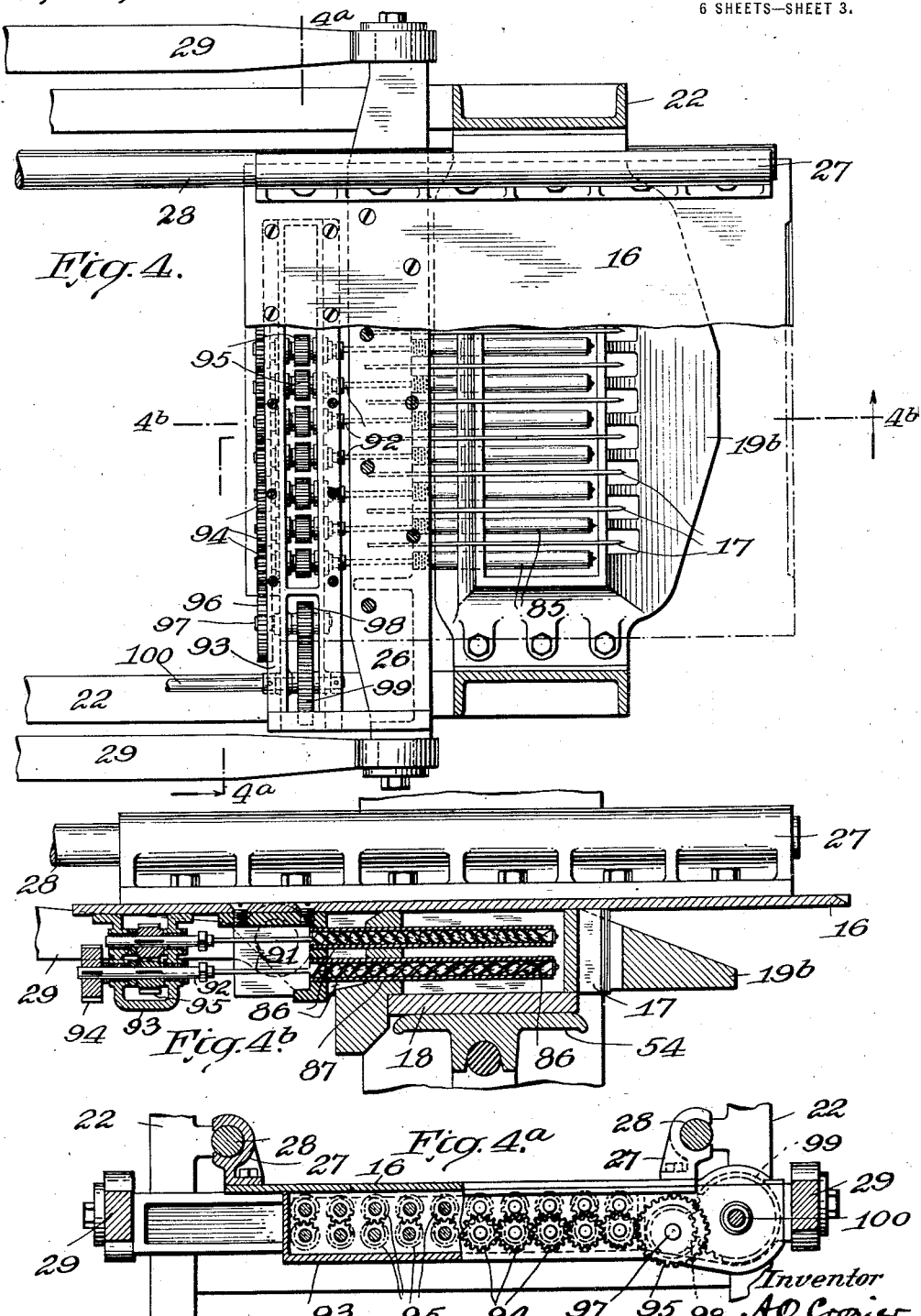

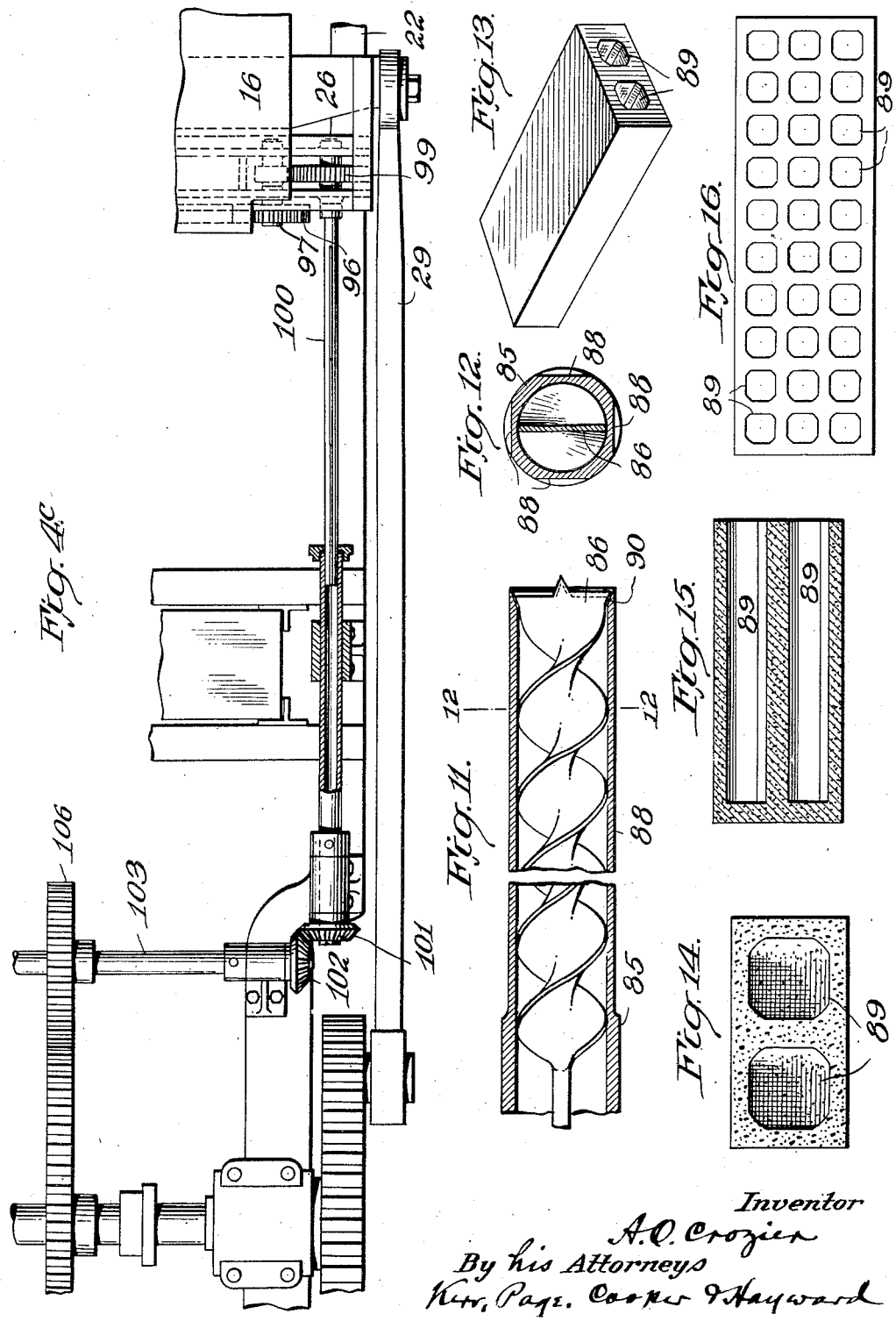

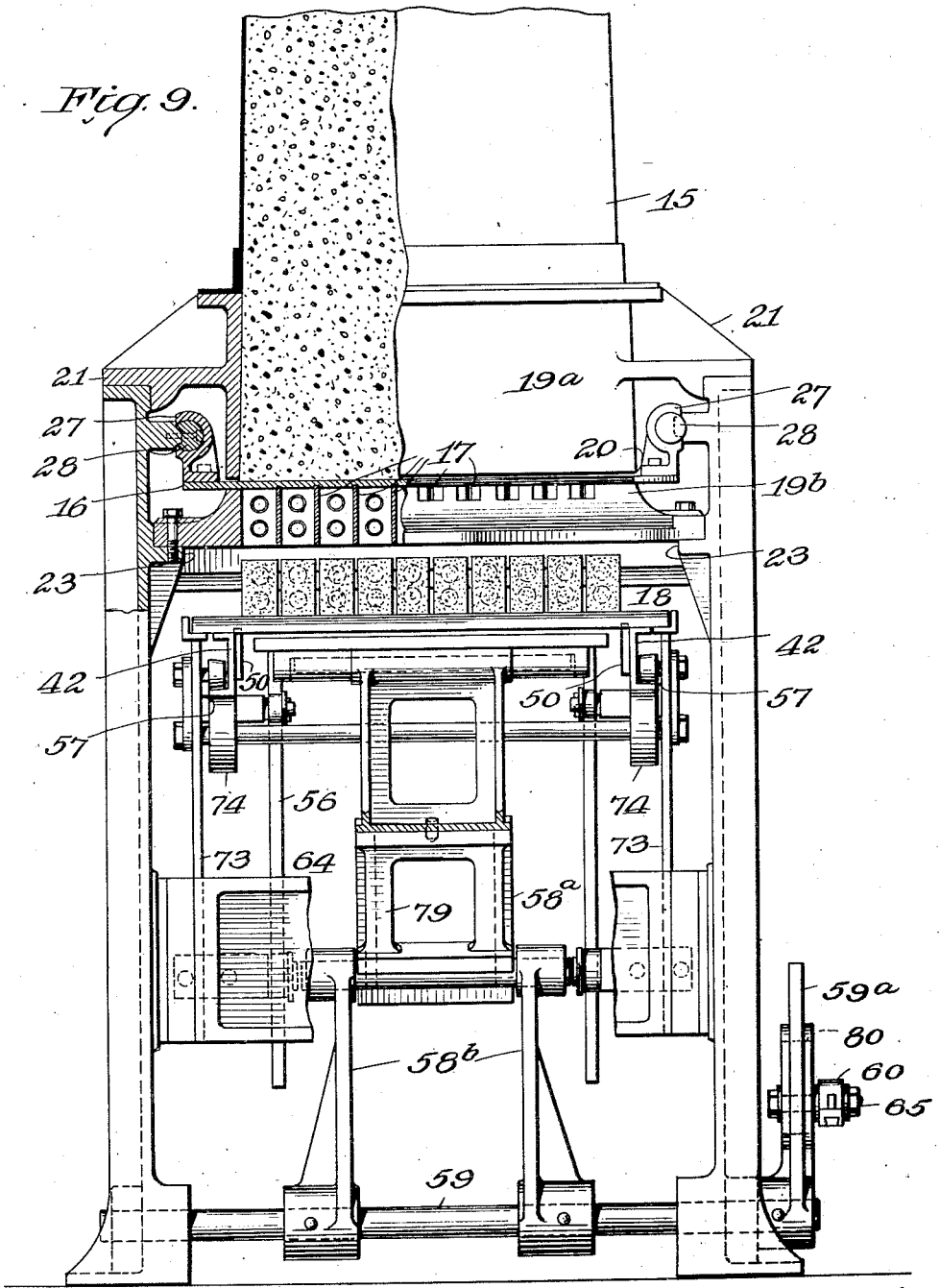

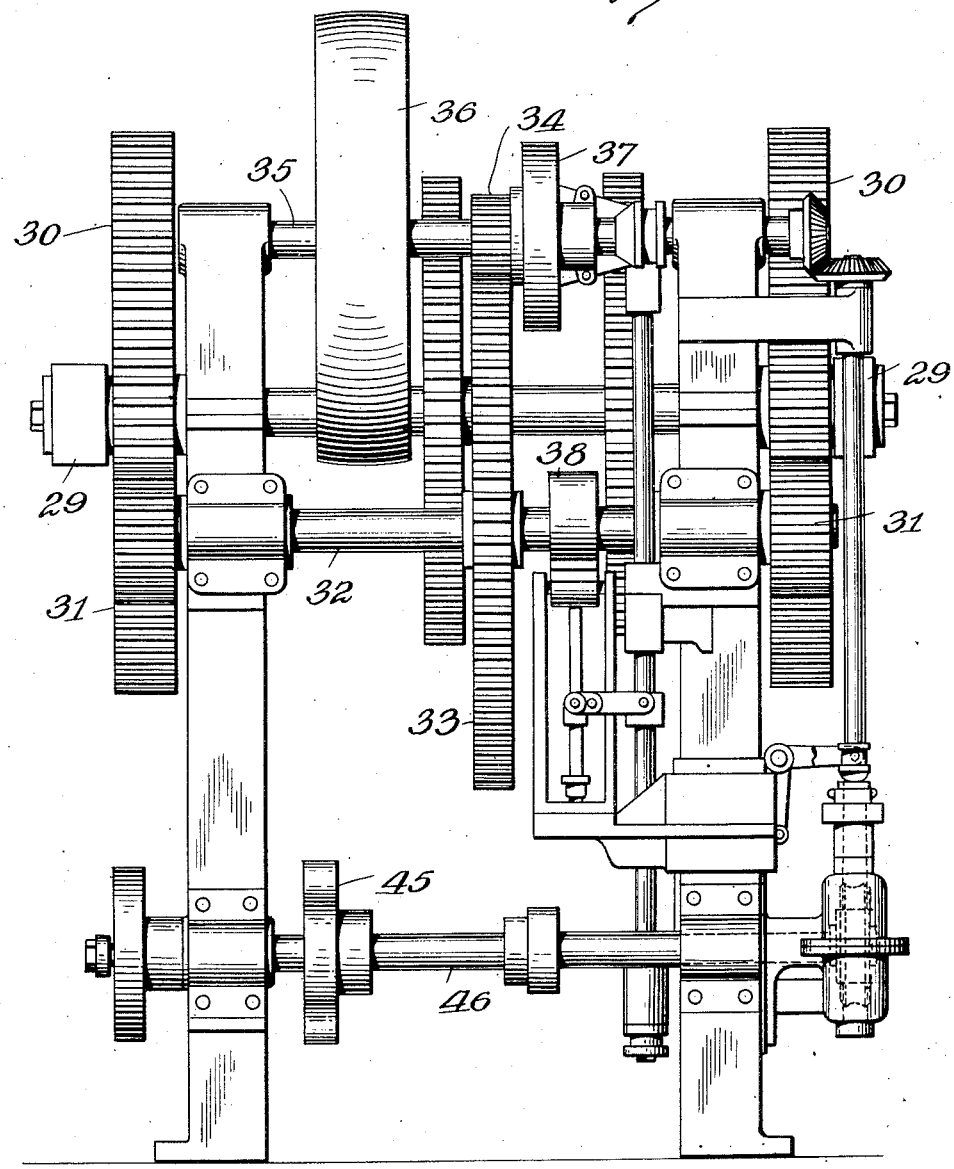

ALFRED OWEN CROZIER, OF NEW YORK, N. Y.

APPARATUS FOR MAKING HOLLOW CONCRETE BRICKS AND OTHER ARTICLES.

1,340,824.   Specification of Letters Patent.   Patented May 18, 1920.

Application filed June 28, 1918. Serial No. 242,387.

*To all whom it may concern:*

Be it known that I, ALFRED OWEN CROZIER, a citizen of the United States, temporarily residing at New York, county and State of New York, have invented certain new and useful Improvements in Apparatus for Making Hollow Concrete Bricks and other Articles, of which the following is a full, clear, and exact description.

This invention relates to hollow concrete brick, blocks, and other products, and its primary object is to provide an improved method and apparatus by which such articles of high quality can be produced rapidly and economically. To this and other ends the invention consists in the novel procedure and features of construction hereinafter described.

In carrying out my method or process in the preferred manner I use "wet" concrete, in most cases concrete of a slushy consistency, that is, a mixture containing cement or other cementitious ingredient, sand or other suitable material, and water in excess, preferably considerably in excess, of the amount required for complete hydration of the cementitious ingredient. In an upright hollow shaft or container, preferably tapering upwardly and square or rectangular in horizontal section, and having a removable bottom, I form an upright column of the slush concrete. The lower portion of the wet cementitious column thus provided is subjected to a marked unwatering and compacting or "densifying" effect by the weight of the mass above, the excess water, being lighter, gradually finding its way upward. The effect is more or less proportional to the height of the column, and in practice the column is maintained (by the continuous or intermittent addition of fresh concrete of proper consistency) preferably at such height that the products carved or shaped from the said lower portion will be "stabilized," that is, unwatered and compacted enough to make them self-sustaining without lateral support, though unset. From said unwatered and compacted lower portion, successive sections are severed, preferably by passing a horizontal knife into the column at the desired height above the base; and before, during or immediately after the severing operation the severed portion is excavated, as by punching, cutting, or boring into the same from the side, end, bottom or top to produce elongated openings therein preferably parallel to the surface. The severed and excavated section, which may or may not be divided or cut up into bricks or small blocks, is now removed from the column, if it has not already been removed, and is set aside to set and harden. If desired the products, before or after they are excavated, may be "faced" on one or more surfaces, for example in any of the ways described in my copending application, Serial No. 239,926, filed June 14, 1918, to which reference may be made for a more complete description of such feature.

Of the various forms of apparatus that may be employed for performing my process as briefly outlined above, I have selected for illustration and specific description herein the one which at the present time is deemed most convenient and efficient for the purpose. This apparatus is illustrated in the accompanying drawings, in which—

Figure 1 shows the machine for the most part in longitudinal vertical section but partly in side elevation.

Fig. 2 is a detail view, partly in longitudinal section, of a portion of the mechanism by which the removable pallet, on which the cementitious column rests, is raised and lowered.

Fig. 3 is a plan view of the machine, below the upright shaft or container in which the cementitious column is formed.

Fig. 4 is a sectional plan view taken about on line 4—4 of Fig. 1, showing the severed section of the column divided into bricks by vertical knives passed through said section and showing the excavating devices extended into the bricks. In this figure the horizontal severing knife is shown in dotted lines.

Fig. 4ª is a detail rear view of the excavator-actuating mechanism shown in plan in Fig. 4.

Fig. 4ᵇ is a detail section, on a plane indicated, approximately, by line *b—b* of Fig. 4.

Fig. 4ᶜ is a detail plan view of the means for driving the excavator-actuating mechanism.

Fig. 5 is a detail section on line 5—5 of Fig. 3.

Figs. 6, 7, and 8 are detail views showing devices of different lengths for varying the throw of the toggle which raises and lowers the pallet.

Fig. 9 is an end view, of the machine partly in cross section, from the right of Fig. 1.

Fig. 10 is an end view from the left of Fig. 1.

Fig. 11 is a longitudinal section illustrating the preferred form of excavating tube, with the auger-bit therein.

Fig. 12 is a cross section on line 12—12 of Fig. 11.

Fig. 13 is a perspective view showing the preferred type of brick made by my process and apparatus.

Fig. 14 is an end view of the brick, on a larger scale to show more clearly the preferred shape of the opening or openings therein.

Fig. 15 is a central horizontal section of the brick illustrated in Fig. 13, showing the preferred depth of the openings or bores therein.

Fig. 16 is an elevational view of a product, for example a concrete "block," having three rows of openings or boxes.

In the apparatus illustrated, an upright hollow shaft 15, Figs. 1 and 9, is provided, into which is deposited the cementitious mixture from which the bricks, blocks or other cementitious products are to be made. Preferably the mixture is of a "slushy" consistency, as explained above; but generally, it is intended that the products (hereinafter referred to as bricks, but it is to be understood that the invention is not limited to the production of bricks) made from the slushy mixture shall be sufficiently compacted and unwatered to be at least self sustaining, that is, shall not have to be confined or supported in molds, before setting of the mixture begins or has proceeded to any material extent. For this purpose the shaft 15 is filled to a height such that the pressure due to the weight of the superincumbent mass will at least partially compact and unwater the lower portion (from which the bricks are cut) to the extent desired. In practice the compacting and unwatering of the lower portion of the column is by preference carried nearly to the extent desired by the pressure mentioned, with the help, if desired, of other agencies which will be explained hereinafter.

The lower portion of the solid or non-tubular column (such lower portion being at least partially compacted and unwatered) is severed from the upper portion by means of a horizontal knife 16 which is passed into the shaft, and the severed portion is shaped into the product or products desired. In the machine illustrated the shaping of the severed portion is a dividing of the same into individual bricks, preferably by means of vertical knives 17, and an excavating of the bricks, preferably by means of auger-bits. The lower portion of the column being imprisoned in the rigid lower part of the shaft, and the knives, or some of them, being of suitable thickness, the knives can enter the column only by compressing the material to a smaller volume, thus further, and in general completing, the compacting (or densification) and unwatering of the product or products. As the vertical knives advance, a series of excavating tubes 85, containing auger bits 86, enter the severed portion of the column between said knives and bore holes endwise or longitudinally of the brick, after which the knives and excavating devices are retracted until the vertical knives and said devices are entirely withdrawn from the column but leaving the forward part of the horizontal knife spanning the shaft and hence supporting the upper portion of the column. The removable "pallet" 18, Fig. 1, which forms the bottom of the shaft, is now lowered and removed with the compacted, unwatered and self-sustaining hollow bricks resting upon it, and a fresh pallet is put in place. The horizontal knife is now completely withdrawn preferably quickly; thereby allowing the entire column to fall suddenly down upon the pallet. The column is thus subjected to an impact, which has a further densifying and unwatering effect. The steps described are then repeated, fresh concrete of the proper consistency being added to the upper part of the column to maintain the height of the latter.

With the above brief outline of its operation in mind the construction and operation of the specific machine illustrated will be readily understood.

The lower part 19 of the shaft 15 is preferably in the form of a heavy casting, rectangular in horizontal section, as in Fig. 4, and preferably having the inner surfaces of its front and rear walls substantially vertical. The upper part of the shaft may be made of sheet metal, and preferably has more or less taper upwardly to facilitate quick descent of the column bodily after the horizontal severing knife 16 is withdrawn. Moreover, the column falls downwardly faster than it spreads laterally, especially in the lower part of the tapered portion, and hence there results a tendency to form spaces or cracks at the walls of the shaft, into which excess water is sucked, thereby aiding the desired unwatering of the mass and expelling such excess water upwardly.

The lower part 19 of shaft 15 is made in two parts or sections, divided horizontally and spaced apart as at 20, Fig. 9, to afford a passageway for the horizontal severing knife 16. The upper section 19ª is supported by means of wings or lugs 21 on frame 22, and the lower section 19ᵇ is rigidly secured on the lugs 23 on the sides of the frame. The front and rear walls of the lower section are provided with vertical slots, as 24, Fig. 11, the intermediate parts of these walls being supported by the necks or webs 25 integral with the outer portions of the walls. The vertical slots constitute passages for the vertical knives 17 which divide and compact laterally the lower portion of the column into bricks, preferably immediately after such portion has been severed from the remainder of the column. The rear walls are provided, between the aforesaid vertical slots, with one or more apertures 87, Fig. 4ᵇ, to receive the reciprocating excavating devices.

The vertical knives 17 can if desired be secured to the horizontal knife 18 in any convenient manner, and both the horizontal and vertical knives are solidly attached to the transverse carrier bar 26, which is actuated in harmony with the rest of the machine by means described hereinafter.

As stated above, the severing and dividing knives are made of substantial thickness, so that in forcing their way into the cementitious column they will aid in compacting or densifying the same. The bevel of the knife edge, especially on the upper knife, has an effect which may be important. Thus, by putting the bevel entirely on the underside the densifying effect is all exerted downwardly, upon the portion (of the column) which is imprisoned in the lower section 19ᵇ of the shaft 15. If the bevel is all on the upper side of the knife, the densifying effect is all exerted on the unsevered part of the column, while if the bevel is equal on the two sides the densifying effect is divided equally, and by putting more of the bevel on one side than on the other, the effect will be divided correspondingly. For instance, with the knife edge shown in Fig. 13 greater densifying effect will be exerted on the part (of the column) above the plane of the knife-passage 20, Fig. 9, than on the portion below it. On the vertical knives the bevels may be as shown in Fig. 15, and the knives may be successively longer from the outer knives inwardly. In such case the tendency is to crowd the cementitious material laterally, to compensate for the omission of knives at the outer sides or faces of the outermost bricks.

Along its side edges the horizontal knife 15, Figs. 1 and 9, is provided with guide sleeves 27 fitted to slide on parallel longitudinal guide rails 28 firmly secured to the adjacent side member of the frame 22. The carrier bar 26 is reciprocated longitudinally of the machine by means of two connecting rods 29 (see also Fig. 3) connected at their rear ends to crank pins on the gears 30. The latter are driven by pinions 31, Fig. 10, on the ends of the transverse shaft 32, which is rotated by gear 33 meshing with a pinion 34 on the main driving shaft 35. The latter shaft is itself driven by a pulley 36. The pinion 34 is loose on its shaft, but is connected thereto at proper intervals, as will be explained hereinafter, by a clutch 37 of any suitable character, actuated by a cam 38 on shaft 32 through the medium of rod 39 (Fig. 1) and arm 40.

The pallets 18 for use under the cementitious column are preferably arranged in a stack 41, Fig. 1, from the bottom of which they are fed out, one at a time, and carried to the shaft 15. For this purpose a horizontally reciprocatory pallet-shifter is provided, in the form of an open frame 42 (see also Fig. 3) which is actuated by links 43 connected to rocker arms 44 on the transverse rock shaft 44ª (Fig. 1) rocked by a cam 45 on shaft 46, through the medium of link 47 coöperating with said cam. Link 47 slides in guides 48 and is connected to one of the arms 44 by a second link 49. On the inside of the side members of the frame 42 are four pairs of weighted dogs 50, held by gravity against stops 51 which serve to limit their counterclockwise movement. The two pallets shown at 18ª, 18ᵇ, Fig. 1, rest at their ends on side rails 52, Figs. 3 and 5, and in front of lugs 53 which serve as stops to prevent rearward displacement or movement of the pallets when the dogs are retracted with the frame 42. When the frame is advanced (toward the right in Fig. 1), the brick-laden pallet 18, the ends of which overhang the table 54, is pushed along on its rails 55 to the position shown in dotted lines, pallet 18ᵇ is moved over upon the table, pallet 18ª is shifted to the position just vacated by pallet 18ᵇ, and the rear pair of dogs push another pallet from the bottom of the stack and move it to the position of pallet 18ª. When the frame or pallet shifter is retracted the dogs pass idly under the pallets to the initial position shown in Fig. 1.

The table 54, Fig. 1, is fixed on top of two vertical slides 56 working between guide rollers 57 and actuated by a toggle composed of members 58ª, 58ᵇ. The latter members are mounted on a transverse shaft 59 and are rocked at proper intervals (as will be described hereinafter) by a link 60, Figs. 1 and 3, connected at its rear to a slide 61 which is reciprocated in guides 62 by a cam 63 on the end of shaft 46. When the toggle is straight it bears against the transverse frame-member 64, but the link 60 has a yielding connection (see Fig. 2) so that it can advance a little farther without injury to the parts, thus obviating the necessity of accurate adjustment, etc. The wrist pin 65, Fig. 2, by which the link 60 is connected to the arm $59^a$ (Fig. 3) on the end of shaft 59 to rock the latter, is seated in a recess in the link and is held therein by the slide 66 which can be withdrawn by means of the handle 67, thereby permitting link 60 to be lifted off said pin.

Shaft 46, which it will be remembered, carries cams 45 and 63 which actuate the pallet-shifter 42 and table 54, is rotated by a worm gear 68, Fig. 1, worm 69, vertical shaft 70, and bevel pinion 71 meshing with bevel pinion 72 on driving shaft 35.

The hollow excavating knives, preferably in the form of tubes 85, open at both ends and preferably non-rotating, are screwed at their rear ends into the carrier bar 26, and at the front terminate preferably a suitable distance behind the cutting edges of the vertical knives 17, Figs. 4 and $4^a$, so that when the latter are fully advanced the tubes extend into the bricks past the centers thereof but not clear through, as shown in Fig. 4. The tubes shown are round, see Fig. 12, but preferably have their forward portions chamfered off on four sides as shown at 88, Figs. 11 and 12, so that the holes produced in the brick are shaped as at 89, Figs. 13, 14 and 16. The forward edges of the tubes preferably are beveled on the inside, as at 90, Fig. 11, and extending lengthwise through each tube is an auger bit 86, the front end of which is about flush with the tube and may be widened to conform to the aforesaid interior bevel. At the rear the auger stems 91, Figs. 4, $4^a$ and $4^b$, extend into rigid connection with short shafts 92 extending through a closed housing 93 secured to the underside of the horizontal knife 16. The shafts in the lower series are driven one from the other by the intermeshing gears 94, outside of the housing. Inside, the lower shafts drive the upper shafts through the gears 95. The gear 94 at the right (Fig. 4) is driven by a gear 96 on a short countershaft 97 carrying at its other end a gear 98 meshing with a gear 99 on the longitudinal driving shaft 100. The latter is telescopic in construction to permit reciprocation of the excavating devices. The tubular section of the shaft, to which the sliding section is splined, carries at its rear end a bevel gear 101, Fig. $4^c$, driven by a bevel gear 102 on the transverse shaft 103 which is itself driven from shaft 104 by gears 105, 106. The housing 93 is completely closed, as previously stated, to prevent entrance of grit into the gearing, and is filled with oil or grease.

The operation of the machine will now be readily understood. The parts being in the positions shown in Fig. 1, the pallet-shifter 42 is advanced (toward the right) carrying the brick-laden pallet 18 to the dotted-line position and placing pallet $18^b$ upon the table 54. The latter is now raised (by straightening of the toggle $58^a$—$58^b$), bringing the fresh pallet firmly against the bottom of the lower shaft-section $19^b$. Knife 16 is now fully retracted, from the cementitious column, by the connecting rods 29, whereupon the column drops in the shaft 15 with a heavy jolt upon the pallet, and fills the said lower shaft-section. Knife 16 is now advanced into the passage between the two shaft sections $19^a$, $19^b$, and on through the column, thus severing the lower portion of the column, in said shaft-section $19^b$. Continuing, the vertical knives 17 enter the vertical slots in section $19^b$ to divide the severed portion of the column into individual bricks and the excavating devices enter the apertures 87. As the rapidly rotating augers 86 advance they bore into the concrete and the borings are passed back through the tubes 85 and are discharged from the rear ends of the latter, where they may be collected in any convenient way, as by means of a chute 107, Fig. 1, and returned to the top of the column for re-use. The tubes 85 keep pace with the augers and shave off into the tubes any concrete not reached by the augers themselves. Moreover, the tubes, reciprocating upon the freshly cut concrete surface "trowel" or "slick" these surfaces, thereby drawing water and cement to the surface and hence making such surfaces denser and smoother. A like effect is produced by the knives 16 and 17. The tubes and augers also tend to crowd and compact the material of the severed section. The knives are now retracted (and, of course, the excavating devices with them) until the vertical knives and the excavating devices are entirely outside of the shaft, but leaving the forward portion of the horizontal knife still in the shaft to support the upper part of the column, as in Fig. 1. The table 54 is now lowered, the filled pallet removed, and the pallet-shifter retracted, thus completing the cycle.

Instead of providing several slots, one above the other, in the shaft to permit portions of different heights to be severed and excavated, I employ a method which is more flexible, so to speak, in that it permits smaller variations of height to be made. For this purpose the vertical supports 73, Figs. 1 and 3, which carry the guide rollers 57 and the supporting roller 74 for the pallet-shifter 42, and the vertical supports 75, Figs. 1 and 5, which carry the pallet rails 52 and the roller 76, are capable of vertical adjustment on the frame of the machine.

The throw of the toggle is also varied by inserting in the upper member 58ª spacing members of different lengths, such as shown at 77, 78, 79, Figs. 6, 7 and 8 (see also Fig. 9), and by shifting the wrist-pin 65, Fig. 1, in the slot 80 in arm 59ª, which rocks the shaft 59 and the lower toggle members 58ᵇ. The hollow shaft 15 is lengthened downwardly by removing the lower section 19ᵇ and substituting another of the proper depth, the additional depth being obtained by extending the section below the plane of the supporting lugs 23, Fig. 9, or an additional portion of proper thickness, not shown, is secured on the underside of the section 19ᵇ. Another horizontal severing knife, without vertical knives, is also substituted for the one shown, or, if the block severed from the column is to be divided into smaller blocks, a horizontal knife with the proper number of vertical knives of suitable height; and, if necessary or desirable, another excavating mechanism is employed with the proper number of excavating devices, suitably spaced in one or more horizontal rows or courses, for example three rows to produce the block shown in Fig. 16.

It will be seen that the process and apparatus described herein produce a hollow brick or block which contains sufficient water for hydration of the cementitious ingredient and yet is self sustaining, though unset, without lateral support by the walls of a mold or other means. At the same time the blocks or bricks illustrated have openings in only one surface and hence may be used exactly like solid blocks or bricks in wall construction, but with the important advantage that the wall is honey-combed, so to speak, with closed air-spaces, thereby diminishing the heat, cold and moisture conductivity of the wall while effectually excluding vermin. The articles are also lighter in weight, thereby greatly diminishing shipping weight and labor of handling, but are nevertheless amply strong enough for practical purposes. The concrete removed from the interior may be discarded, of course, but preferably it is saved and re-used, thus adding an important item of economy to the process. Preferably from twenty-five to fifty per cent. of the concrete is removed, thereby effecting a proportionate saving of water, sand and cement, and materially reducing the cost of the finished product.

The process herein disclosed is claimed in my application, Serial No. 224,046, filed March 22, 1918.

It is to be understood that the invention is not limited to the specific construction herein illustrated and described, but can be embodied in other forms without departure from its spirit as defined by the following claims.

I claim:

1. In a machine for the manufacture of hollow cementitious products, in combination, a hollow shaft or container for an unset cementitious column, a removable closure for the bottom of the shaft, a horizontal knife movable into the lower portion of the shaft to sever from the cementitious column the part thereof below the knife, mechanism for excavating said part of the column, mechanism for advancing and retracting the knife and the excavating mechanism, means for removing said bottom closure and placing another in position, and means for actuating said means and mechanisms in proper order.

2. In a machine for the manufacture of hollow cementitious products, in combination, a hollow shaft or container for an unset cementitious column, a knife movable into and out of the cementitious column to sever a portion therefrom, one or more knives to divide said portion into a plurality of parts; mechanism for excavating said parts, and means for actuating said knives and mechanism and removing the divided and excavated portion of the column.

3. In a machine for the manufacture of hollow cementitious products, in combination, a hollow shaft or container for an unset cementitious column, a horizontal knife movable into and out of the column to sever a portion therefrom, one or more vertical knives arranged to divide the said portion of the column into parts after said portion is severed from the column, a plurality of devices to excavate said parts, and means for actuating the horizontal and vertical knives.

4. In a machine for the manufacture of hollow cementitious products, in combination, an upright hollow shaft or container for an unset cementitious column, a horizontal knife movable into and out of the lower portion of the column to sever from the column the part below the knife, one or more vertical knives movable into and out of the column to divide the portion thereof below the horizontal knife, mechanism to excavate the said portion of the column, and means for actuating said knives and excavating mechanism in harmony with each other.

5. In a machine for the manufacture of hollow cementitious products, in combination, an upright hollow shaft or container for an unset cementitious column, means for removing a portion of the column from one end thereof, mechanism for excavating such portion, and means for actuating said means and mechanism in the desired order.

6. In a machine for the manufacture of hollow cementitious products, in combination, an upright hollow shaft or container for an unset cementitious column, a horizontal knife movable into and out of the column to sever a portion thereof, one or more vertical knives connected to the horizontal knife beneath the same and arranged to enter the column in rear of the cutting edge of the horizontal knife to divide the severed portion of the column into parts after such portion has been severed, excavating devices movable into and out of the column with said vertical knives to excavate said parts, and means for actuating the knives and excavating devices.

7. In a machine for the manufacture of hollow cementitious products, in combination, a hollow shaft or container for an unset cementitious column; means for severing, dividing, and excavating a portion of the column, comprising a horizontal knife movable into the column transversely thereof, one or more knives attached to the horizontal knife on one side of the same, and excavating devices attached to the horizontal knife and mechanism for actuating said means.

8. In a machine for the manufacture of hollow cementitious products, in combination, an upright hollow shaft or container for an unset cementitious column, a transverse carrier bar adjacent to the shaft and movable toward and from the same, a horizontal knife connected to said bar for actuation thereby and movable into and out of the shaft to sever a portion of the cementitious column therein, one or more rotary excavating devices associated with the said bar and movable into and out of the shaft to excavate the said portion of the column, and means for actuating the carrier bar and rotary excavating devices.

9. In a machine for the manufacture of hollow cementitious products, in combination, an upright hollow shaft for an unset cementitious column, means for severing a portion of the column from the lower part thereof, means permitting lengthening the part of the shaft below the path of the severing means, whereby portions of different heights may be severed from the column, and means for excavating said portion of the column.

10. In a machine for the manufacture of hollow cementitious products, in combination, an upright hollow shaft or container for an unset cementitious column, said shaft having a lower part permitting variation of the height of the lower part of the shaft; a removable bottom for said lower part; a vertically adjustable support for the removable bottom; and means movable into and out of the shaft between the lower part and the upper part to sever a portion of the column therein and excavate such portion.

11. In a machine for the manufacture of hollow cementitious products, in combination, an upright hollow shaft or container for an unset cementitious column, said shaft having a lower part; means movable into and out of the shaft between said lower part and the upper part to sever a portion of the column therein; means for excavating said portion of the column; a removable bottom for the lower part of the shaft; vertically movable and vertically adjustable supporting means for said removable bottom; and horizontally movable and vertically adjustable means for displacing the removable bottom from said supporting means and for putting another removable bottom in position thereon.

12. In a machine for the manufacture of hollow cementitious products, in combination, a hollow shaft or container for an unset cementitious column, a knife movable into and out of the shaft to sever successive sections of the column from one end thereof, means for operating upon such severed sections to excavate the same, and to remove a portion of the cementitious material from each section and mechanism for actuating said knife and excavating means in proper order.

13. In a machine for the manufacture of cementitious products, in combination, an upright hollow shaft or container for an unset cementitious column, a removable closure for the bottom of the shaft, a horizontal knife movable into and out of the shaft to sever from the column the portion thereof between the knife and said closure, means for excavating said portion of the column, mechanism for removing said closure with the excavated portion of the column thereon and positioning another closure thereunder, and power-driven means for actuating the knife, excavating means, and closure-removing and positioning means in proper order.

14. In a machine for the manufacture of hollow cementitious products, in combination, a hollow shaft or container for an unset cementitious column; means for removing a portion of the column from one end thereof; one or more rotary and reciprocatory excavating devices to operate upon said portion of the column; and mechanism for actuating said means and devices.

15. In a machine for the manufacture of hollow cementitious products, in combination, a hollow shaft or container for an unset cementitious column; means for removing a portion of the column from one end thereof; excavating means comprising one or more reciprocatory excavating tubes and a rotary boring tool in each tube, to excavate said portion of the column; and mechanism for actuating the aforesaid means in the desired order.

16. In a machine for the manufacture of hollow cementitious products, in combination, means for forming and temporarily supporting a solid, unset, self-sustaining product of the desired shape and size; one or more open-ended excavating tubes movable into and out of said supporting means; one or more excavating tools in said tube or tubes and movable therewith; and means for actuating the said one or more tubes and excavating tools.

17. In a machine for the manufacture of hollow cementitious products, in combination, a temporary support for a solid unset cementitious product of the desired shape and size; an open-ended tube adapted to be moved longitudinally into and out of such product while the same is held by said support; an auger inside the tube and movable into and out of said product to excavate a path for the tube; and means for actuating the tube and the auger.

18. In a machine for the manufacture of hollow cementitious products, in combination, means for forming and temporarily supporting a solid, unset cementitious product of the desired shape and size, means comprising a reciprocatory excavating device for removing a portion of the product to form a passage or opening therein parallel to one of its faces while it is held by said means, and means for removing the product.

19. In a machine for the manufacture of hollow cementitious products, in combination, a hollow shaft or container for an unset cementitious column, a severing knife movable into and out of the shaft to sever a portion of the column therefrom, an open-ended tube carried by the knife and movable therewith into the shaft; an auger in said tube and movable therewith into the shaft to excavate a path for the tube; mechanism for removing from the shaft the severed and excavated portion thereof; and means for actuating said knife, tube and auger and said mechanism.

20. In a machine for the manufacture of hollow cementitious products, in combination, a hollow shaft or container for an unset cementitious column; a covering knife movable into and out of one end of the shaft to sever a portion of the column from one end thereof; an auger movable into and out of the shaft to excavate a passage or opening in the severed portion of the column; and means for actuating the knife and auger.

21. In a machine for the manufacture of hollow cementitious products, in combination, a hollow shaft or container for an unset cementitious column; a severing knife movable into and out of the column to sever a portion of the column from one end thereof; a member connected to said knife to actuate the same; an open-ended tubular knife carried by said member to move into and out of the shaft with the knife; an auger extending through the tubular knife and movable therewith to excavate a path therefor in the severed portion of the column; and means carried by the knife for rotating the auger as the same is advanced into the shaft.

22. In a machine for the manufacture of hollow cementitious products, in combination, an open-ended tube chamfered externally on one or more sides, means for reciprocating the tube, an auger inside the tube to excavate a path for the tube, and means for actuating the auger.

23. In a machine for the manufacture of hollow cementitious products, in combination, an open-ended tube chamfered externally on one or more sides, means for reciprocating the tube, and reciprocatory means inside the tube to excavate a path therefor.

24. In a machine for the manufacture of hollow cementitious products, in combination, an open-ended reciprocatory tube having its forward end beveled to form a cutting edge, and a reciprocatory device inside the tube to excavate a path therefor.

25. In a machine for the manufacture of hollow cementitious products, in combination, an open-ended reciprocatory tube cylindrical inside and chamfered externally on one or more sides and having its forward end internally beveled to form a cutting edge, and a reciprocatory device inside the tube to excavate a path therefor.

26. In a machine for the manufacture of hollow cementitious products, in combination, a hollow shaft or container for an unset cementitious column, means for removing a portion of the column from one end thereof, one or more reciprocatory excavating devices to operate upon said portion of the column, and provided with outlet passages and mechanism for operating said means and devices.

27. In a machine for the manufacture of hollow cementitious products, in combination, a hollow shaft or container for an unset cementitious column, means for removing a portion of the column from one end thereof, one or more reciprocatory excavating tubes to operate upon said portion of the column, and mechanism for actuating the aforesaid means and excavating tubes in the desired order.

28. In a machine for the manufacture of hollow cementitious products, in combination, means for forming and temporarily supporting a solid unset cementitious mass of desired size and shape, reciprocatory excavating devices adapted to form one or more passages or openings in said mass parallel to one of its faces while it is held by said supporting means, mechanism for dividing the mass between the paths of said excavating devices into one or more products of the desired size and shape, and means for removing the product from said supporting means.

29. In a machine for the manufacture of hollow cementitious products, in combination, a mold, means for closing the bottom of said mold, excavating devices movable into said mold, and mechanism for moving said first-named means to mold-closing position and subsequently operating said excavating devices.

In testimony whereof I hereunto affix my signature.

ALFRED OWEN CROZIER.